US009699802B2

(12) United States Patent
Vannithamby et al.

(10) Patent No.: US 9,699,802 B2
(45) Date of Patent: Jul. 4, 2017

(54) USER EQUIPMENT UPLINK TOGGLING FOR DUAL CONNECTIVITY NETWORKS

(71) Applicant: Intel Corporation, Santa Clara, CA (US)

(72) Inventors: Rath Vannithamby, Portland, OR (US); Satish Chandra Jha, Hillsboro, OR (US); Ali T. Koc, Hillsboro, OR (US); Kathiravetpillai Sivanesan, Richardson, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/517,302

(22) Filed: Oct. 17, 2014

(65) Prior Publication Data

US 2015/0215961 A1 Jul. 30, 2015

Related U.S. Application Data

(60) Provisional application No. 61/933,864, filed on Jan. 30, 2014.

(51) Int. Cl.
*H04J 3/00* (2006.01)
*H04W 72/12* (2009.01)
*H04L 5/00* (2006.01)
*H04W 52/36* (2009.01)
(Continued)

(52) U.S. Cl.
CPC ....... *H04W 72/1268* (2013.01); *H04L 5/0005* (2013.01); *H04W 52/34* (2013.01); *H04W 52/365* (2013.01); *H04W 72/0446* (2013.01)

(58) Field of Classification Search
CPC ............. H04W 72/1268; H04W 52/34; H04W 52/365; H04W 72/0446; H04L 5/0005
See application file for complete search history.

(56) References Cited

U.S. PATENT DOCUMENTS

| 8,265,044 B2* | 9/2012 | Zhang | H04B 7/2606 370/336 |
|---|---|---|---|
| 2014/0016576 A1* | 1/2014 | Noh | H04W 52/362 370/329 |

(Continued)

*Primary Examiner* — Abdelnabi O Musa
(74) *Attorney, Agent, or Firm* — Schwegman Lundberg & Woessner, P.A.

(57) ABSTRACT

A Long Term Evolution (LTE) protocol enhancement realizes the full benefit of dual connectivity User Equipment (UE) in LTE networks by providing a toggling mechanism to alleviate uncertainty in available transmit power, or power headroom, for uplink transmissions so that efficient utilization of the uplink radio resources can be achieved in dual connectivity. A new field for Radio Resource Control (RRC) messages enables toggling for alternating transmissions to Master and Secondary Evolved Node Bs (MeNBs and SeNBs) during alternating time periods. An enhanced Media Access Control Element enables toggling by the MeNB, SeNB or UE. In one embodiment, the UE schedules uplink transmissions to a SeNB during even numbered time divisions when the UE schedules the uplink transmissions to the MeNB during the odd numbered time divisions, or during the odd numbered time divisions when the UE schedules the uplink transmissions to the MeNB during the even numbered time divisions.

9 Claims, 4 Drawing Sheets

(51) Int. Cl.
*H04W 72/04* (2009.01)
*H04W 52/34* (2009.01)

(56) References Cited

U.S. PATENT DOCUMENTS

| | | | |
|---|---|---|---|
| 2014/0056278 A1* | 2/2014 | Marinier | H04W 72/044 370/330 |
| 2014/0105141 A1* | 4/2014 | Noh | H04W 52/04 370/329 |
| 2014/0348146 A1* | 11/2014 | Malkamaki | H04J 3/16 370/337 |
| 2015/0208366 A1* | 7/2015 | Papasakellariou | H04W 52/244 370/311 |
| 2016/0205577 A1* | 7/2016 | Lunden | H04W 24/10 370/252 |

* cited by examiner

USER EQUIPMENT UPLINK TOGGLING FOR DUAL CONNECTIVITY NETWORKS

PRIORITY CLAIM

The present application for patent claims the benefit of priority under 35 U.S.C. 119(e) to U.S. Provisional Patent Application Ser. No. 61/933,864, entitled "TOGGLING UPLINK TRANSMISSION FOR DUAL CONNECTIVITY," filed Jan. 30, 2014, which is incorporated herein by reference in its entirety.

TECHNICAL FIELD

Examples generally relate to Long Term Evolution (LTE) networks. One or more examples relate to User Equipment uplink (UL) resource management in LTE dual connectivity network architecture(s).

BACKGROUND

Wireless communication systems are widely deployed to provide various types of communication content such as voice, data, and other media. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Dual connectivity is a new innovative network architecture that allows a User Equipment (UE) to connect with more than one base station and/or network cell simultaneously. The UE can connect with a Master Cell Group (MCG) and a Secondary Cell Group (SCG) at the same time by connecting to a Master Evolved Node B (MeNB) and a Secondary Evolved Node B (SeNB) at the MCG and SCG respectively. The simultaneously connected MeNB and the SeNB are counterparts in Discontinuous Reception (DRX) operations.

When a UE is served by multiple eNBs, resources are allocated by the corresponding eNBs. The MeNB and SeNB allocate separate physical UL radio blocks in corresponding frequencies to a dual connectivity UE such that the UL transmit power resource at the UE is common to both ULs. Thus, there is a need for managing UE UL transmit power in dual connectivity networks

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Figure 1:
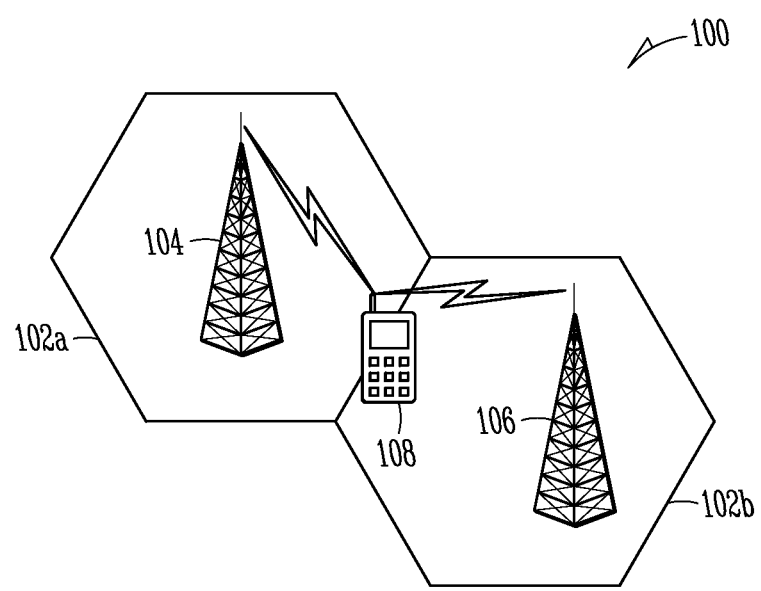
FIG. 1 is a high level block diagram illustrating an example of dual connectivity in a cellular network, according to some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration." Any embodiment described herein as "exemplary" is not necessarily to be construed as preferred or advantageous over other embodiments.

The terms "communication station", "station", "handheld device", "mobile device", "wireless device" and "User Equipment" (UE) as used herein refer to a wireless communication device such as a cellular telephone, smartphone, tablet, netbook, wireless terminal, laptop computer, femtocell, High Data Rate (HDR) subscriber station, access point, access terminal, or other personal communication system (PCS) device. The device may be either mobile or stationary.

The term "access point" as used herein may be a fixed station. An access point may also be referred to as an "access node" or a "base station", or by some other similar terminology known in the art. An "access terminal" may also be called a "mobile station", a "User Equipment (UE)", or a "wireless communication device", or by some other similar terminology known in the art. Dual connectivity in wireless cellular networks has been approved by standards bodies for 3rd Generation Partnership Project (3GPP) LTE advanced releases.

Dual connectivity allows a UE to connect with more than one cell simultaneously. A UE may be concurrently connected to a Master Evolved Node B (MeNB) belonging to a Master Cell Group (MCG) and a Secondary Evolved Node B (SeNB) belonging to a Secondary Cell Group (SCG). When a UE is served by multiple eNBs, radio resources are allocated by the corresponding eNBs. Separate physical radio resource blocks are allocated to the UE by both eNBs for UE UL transmission. Thus, the transmit power/power headroom for uplink transmissions of the associated eNB resource at the UE is common to both UL radio links.

Separate allocation of radio resource blocks causes the amount of UE transmit power/power headroom for uplink transmissions of the associated eNB available to each eNB for simultaneous UL transmissions to be unknown because neither radio resource block has knowledge of its counterpart's usage of the resource. The UE may not have sufficient transmit power/power headroom for uplink transmissions of the associated eNB to utilize resources allocated from both eNBs, resulting in UL resource waste, while scaling down transmit power increases packet error rates.

A UE may convey a power headroom value and other related information associated with each UL radio control block to all eNBs so that the eNBs conservatively allocate the radio resources such that power headroom at the UE is adequate for one or both ULs to transmit simultaneously. In another method, the eNBs have knowledge of a scheduling scheme so that a scheduling pattern can allow the UE to utilize up to the maximum transmit power (i.e., the power headroom for uplink transmissions of the associated eNB) capability at all times.

Unfortunately, the X2 inter-eNB communications protocol interface does not efficiently support a coordinated UL transmission for dual connectivity enabled UEs. Thus, the eNBs can neither directly exchange uplink power control information, nor gain counterpart UL sub-frame scheduling knowledge. Procedures, signaling mechanisms, and message structures and parameters to realize a UL schedule toggling mechanism for removing uncertainty in the available transmit power/power headroom for uplink transmissions of the associated eNB at the UE for UL transmissions are detailed below with reference to FIGS. 1-5.

FIG. 1 is a high level block diagram illustrating an example of dual connectivity in a cellular network 100. A cell 102a, belonging to an MCG, comprises a MeNB 104. A cell 102b, belonging to an SCG, comprises a SeNB 106. A UE 108 is simultaneously connected to the MeNB 104 and the SeNB 106. While one SeNB 106 is shown for simplicity, the UE 108 may be simultaneously connected to more than one, i.e., a plurality, of SeNBs. User equipment uplink toggling for dual connectivity networks toggles, (i.e. schedules during alternating time divisions) uplink transmissions between the simultaneously connected MeNBs 104 and SeNBs 106 such that full power headroom for uplink transmissions of the associated MeNB 104 or SeNB 106 is available to the UE 108 during each alternating time division.

In one embodiment, the UE 108 comprises a processor and transceiver configured to enable time division uplink transmission scheduling, schedule uplink transmissions to the MeNB 104 during odd or even numbered time divisions, and schedule uplink transmissions to the SeNB 106 during even numbered time divisions when the MeNB 104 schedules uplink transmissions during odd numbered time divisions, or during odd numbered time divisions when the MeNB 104 schedules uplink transmissions during even numbered time divisions. In other embodiments, uplink transmissions are alternately scheduled between the MeNB 104 and a plurality of SeNBs 106 according to equal or variable time division patterns and durations.

Figure 2:
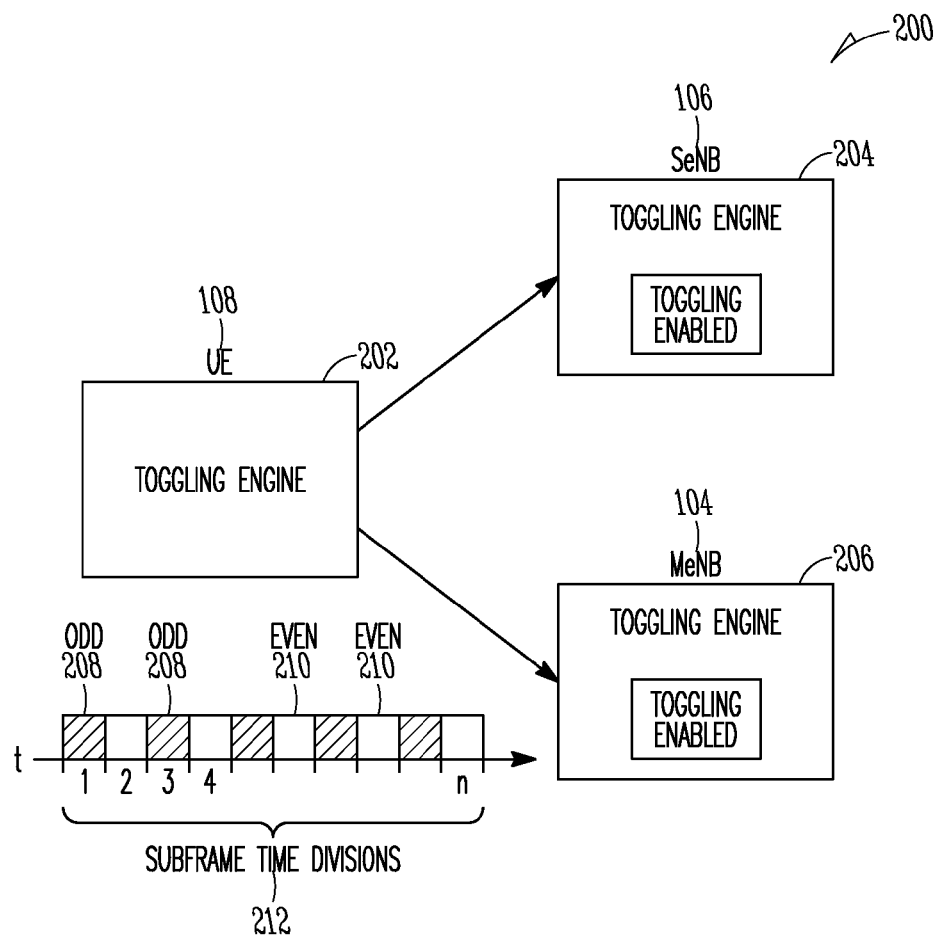
FIG. 2 is high level conceptual block diagram, according to some embodiments.

FIG. 2 is high level conceptual block diagram showing sub-frame scheduling 200 of UL transmissions by the MeNB 104 and SeNB 106, according to some embodiments. A schedule toggling mechanism removes uncertainty in the available transmit power/power headroom for uplink transmissions of the associated eNB at the UE 108 for uplink transmission so that efficient utilization of the uplink radio resources is achieved, especially when both the MeNB 104 and the SeNB 106 are moderately to highly loaded.

As shown, sub-frame time divisions 212 are divided into alternate odd 208 and even 210 sub-frame time divisions. While sub-frame time divisions are illustrated for simplicity, a time division may comprise a frame time division, a sub-frame time division, multiple sub-frame time divisions, or any predetermined division of time.

The mechanism toggles the UL transmissions between the MeNB 104 and the SeNB 106 by scheduling odd UL sub-frame time divisions 208 for transmission to the MeNB 104 and even UL sub-frame time divisions 210 for transmission to the SeNB 106. Alternately, the mechanism may toggle the UL transmissions between the MeNB 104 and the SeNB 106 by scheduling even UL sub-frame time divisions 210 for transmission to the MeNB 104 and odd UL sub-frame time divisions 208 for transmission to the SeNB 106. In this way, each eNB (the SeNB 106 and the MeNB 104) may fully utilize the whole of the available UE 108 transmit power/power headroom for uplink transmissions of the associated eNB during its sub-frame transmission time period.

A toggling engine comprises a UE component 202, a SeNB component 204 and a MeNB component 206. When the toggling engine components (202-206) are enabled, both the MeNB 104 and the SeNB 106 have exact counterpart scheduling knowledge. The UE 108 unambiguously transmits to the MeNB 104 and SeNB 106 during the alternate odd 208 and even 210 sub-frame time divisions 212, respectively. Alternately, the UE 108 may transmit to the MeNB 104 and SeNB 106 during the alternate even 210 and odd 208 sub-frame time divisions 212, respectively. During each sub-frame time division 212 transmission, the UE 108 may utilize its entire available transmit power/power headroom for uplink transmissions of the associated eNB. Toggling can be enabled as needed and can be initiated by the eNBs (104, 106) or by the UE 108.

Enhancements to current 3GPP LTE communications protocols provide messages and signaling to support the UL transmission toggling engine. Toggling information may be included in Radio Resource Control (RRC) messages or in other data structures such as a Media Access Control (MAC) Control Element (CE) header. An enhanced RRC configuration message includes information to support time division toggling operations, comprising instructions to enable the toggling operation, toggling pattern, start time of toggling, duration of toggling, and so on. In one embodiment, the enhanced RRC configuration message includes information bit fields as designated in Table 1 below:

TABLE 1

| | |
|---|---|
| ToggleEnabled | 0 = Disabled, 1 = Enabled |
| TogglingPattern | Pattern of toggling between MeNB and SeNB on uplink |
| StartTimeofToggling | System Frame Number when the toggling operation will start |
| DurationofToggling | Duration of the toggling operations |

In another embodiment, a novel Downlink (DL) MAC CE is used by an eNB to request a Dual Connectivity UE to enable or disable Time Division Multiplexed (TDM) toggling. The DL MAC CE comprises a DL MAC CE sub-header having a Logical Channel Identifier (LCID) selected from the reserved LCID pool for Downlink Shared Channel (DL-SCH), which is used to identify the DL MAC CE for supporting time division toggling operations.

In yet other embodiments, configuration and operational parameters are predetermined fixed values. Some other embodiments may automatically enable uplink scheduling, or implement alternative toggling schemes such as interchanging odd and even frames, duration periods, and toggling patterns.

Sub-frame division toggling operations are backwardly compatible with legacy systems having synchronized UL Hybrid Automatic Repeat Request (HARQ), which needs the UE to conduct specific sub-frame processes at specifically numbered sub-frame time divisions and to use the same HARQ process number every 8 sub-frames because the odd/even sub-frame division toggling is inherently aligned with the legacy HARQ process.

Figure 3:
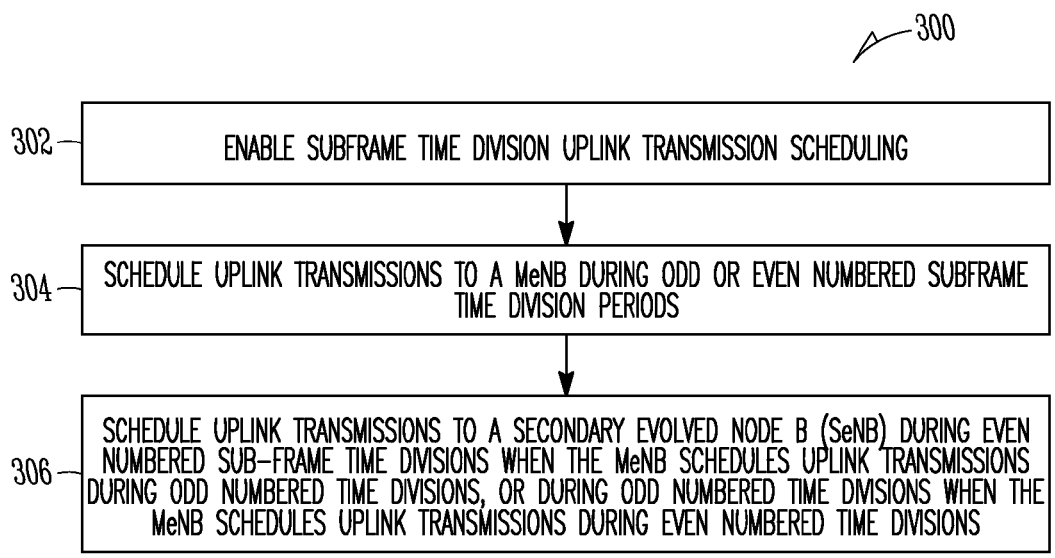
FIG. 3 is a high level overview flowchart of User Equipment Uplink Toggling for Dual Connectivity Networks, according to some embodiments.

FIG. 3 is a high level overview flowchart of a method 300 for user equipment uplink equipment uplink scheduling for dual connectivity networks, according to some embodiments. The method 300 begins in operation 302 by enabling time division uplink transmission scheduling according to the embodiments detailed in FIG. 2. Time division uplink transmission scheduling may be initiated by the UE 108 by sending an RRC message to associated eNBs, or when an RRC message comprising uplink toggling information is received from an associated eNB.

UL transmissions to a MeNB 104 are scheduled during odd or even numbered time division periods in operation 304. In operation 306, UL transmissions to a SeNB 106 are scheduled during even numbered time divisions when the MeNB 104 schedules uplink transmissions during odd numbered time divisions, or during odd numbered time divisions when the MeNB 104 schedules uplink transmissions during even numbered time divisions. When the UE 108 is simultaneously connected to a plurality of SeNBs 106, toggling will alternate between the MeNB 104 and all of the SeNBs 106.

Each UL transmission may use all available transmit power/power headroom for uplink transmissions of the associated eNB. The UE 108 alternates UL transmissions to all eNBs according to time division toggling unless toggling is disabled. A time division may comprise a frame time division, a sub-frame time division, multiple sub-frame time divisions, or any predetermined division of time.

Figure 4:
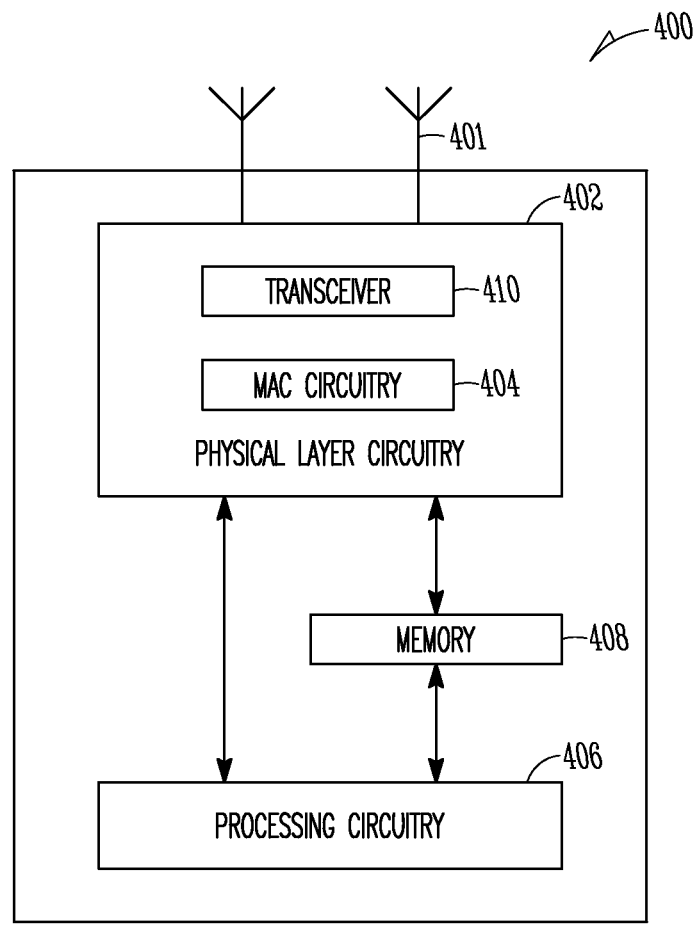
FIG. 4 is a functional diagram of an exemplary communication station, in accordance with some embodiments.

FIG. 4 shows a functional diagram of an exemplary communication station 400 in accordance with some embodiments. The communication station 400 may be suitable for use as a MeNB 104 (FIG. 1) or SeNB 106 (FIG. 1) in accordance with some embodiments. The communication station 400 may also be suitable for use as a handheld device, mobile device, cellular telephone, smartphone, tablet, netbook, wireless terminal, laptop computer, femtocell, HDR subscriber station, access point, access terminal, or other PCS device.

The communication station 400 may include physical layer circuitry 402 having a transceiver 410 for transmitting and receiving signals to and from other communication stations using one or more antennas 401. The physical layer circuitry 402 may also comprise medium access control (MAC) circuitry 404 for controlling access to the wireless medium. The communication station 400 may also include processing circuitry 406 and memory 408 arranged to perform the operations described herein. In some embodiments, the physical layer circuitry 402 and the processing circuitry 406 may be configured to perform operations detailed in FIGS. 2 and 3.

In accordance with some embodiments, the MAC circuitry 404 may be arranged to contend for a wireless medium and configure frames or packets for communicating over the wireless medium, and the physical layer circuitry 402 may be arranged to transmit and receive signals. The physical layer circuitry 402 may include circuitry for modulation/demodulation, up-conversion/down-conversion, filtering, amplification, etc. In some embodiments, the processing circuitry 406 of the communication station 400 may include one or more processors. In some embodiments, two or more antennas 401 arranged for sending and receiving signals may be coupled to the physical layer circuitry 402. The memory 408 may store information for configuring the processing circuitry 406 to perform operations for configuring and transmitting message frames and performing the various operations described herein. The memory 408 may comprise any type of memory, including non-transitory memory, for storing information in a form readable by a machine (e.g., a computer). For example, the memory 408 may comprise a computer-readable storage device, read-only memory (ROM), random-access memory (RAM), magnetic disk storage media, optical storage media, flash-memory devices, and other storage devices and media.

In some embodiments, the communication station 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or another device that may receive and/or transmit information wirelessly.

In some embodiments, the communication station 400 may include one or more antennas 401. The antennas 401 may comprise one or more directional or omnidirectional antennas, including, for example, dipole antennas, monopole antennas, patch antennas, loop antennas, micro-strip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas 401 may be effectively separated for spatial diversity and the different channel characteristics that may result between each of the antennas 401 and the antennas of a transmitting station.

In some embodiments, the communication station 400 may include one or more of a keyboard, a display, a non-volatile memory port, multiple antennas, a graphics processor, an application processor, speakers, and other mobile device elements (not shown). The display may be a Liquid Crystal Display (LCD) screen including a touch screen.

Although the communication station 400 is illustrated as having several separate functional elements, two or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs), and combinations of various hardware and logic circuitry for performing at least the functions described herein. In some embodiments, the functional elements of the communication station 400 may refer to one or more processes operating on one or more processing elements.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 400 may include one or more processors and may be configured with instructions stored on a computer-readable storage device (e.g., the memory 408).

Figure 5:
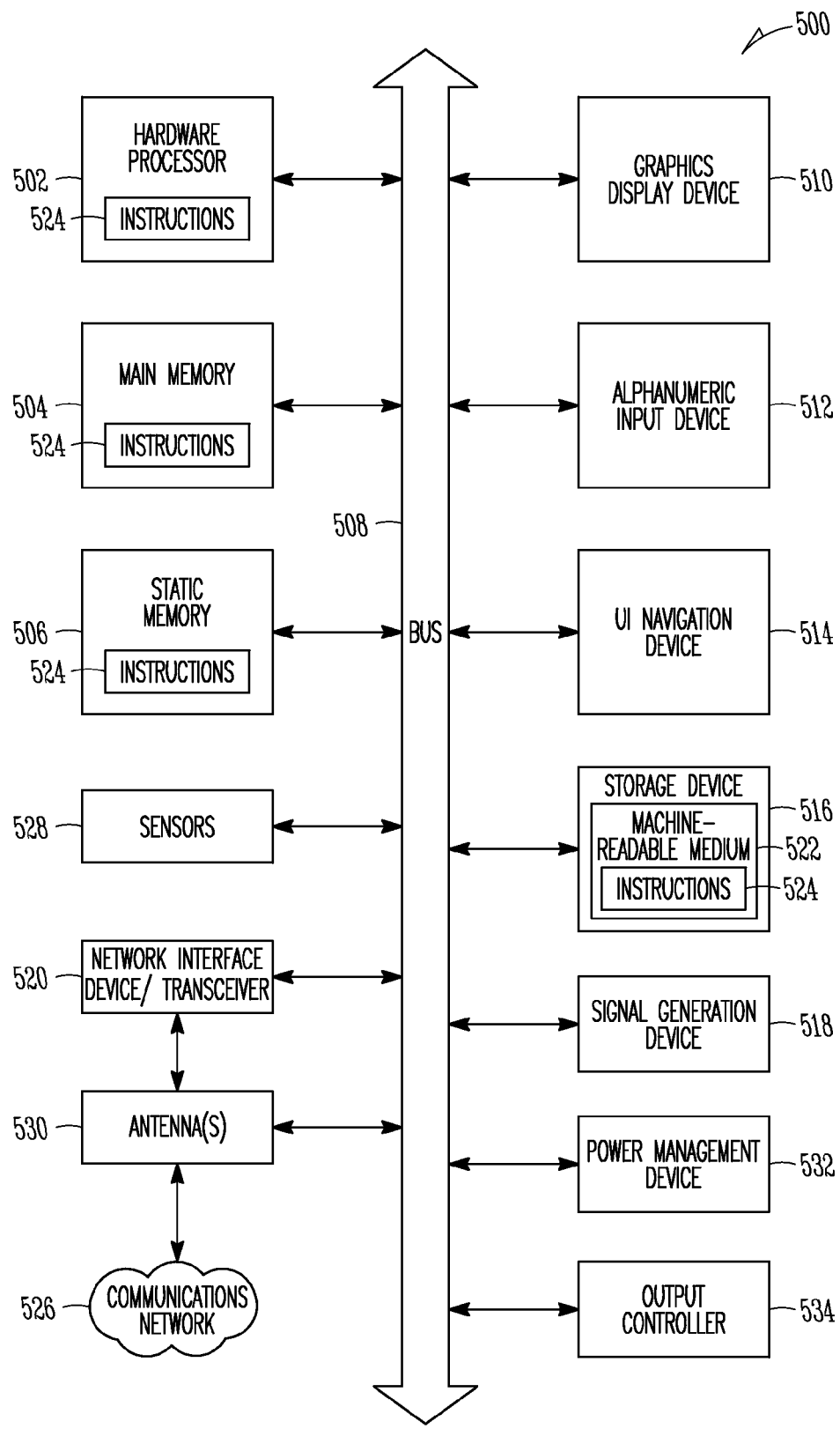
FIG. 5 is a block diagram of an example of a machine upon which any of one or more techniques (e.g., methods) discussed herein may be performed.

FIG. 5 illustrates a block diagram of an example of a machine 500 upon which any one or more of the techniques (e.g., methodologies) discussed herein may be performed. In one embodiment, the machine 500 may be a UE 108. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in a peer-to-peer (P2P) (or other distributed) network environment. The machine 500 may be a personal computer (PC), a tablet PC, a set-top box (STB), a personal digital assistant (PDA), a mobile telephone, a web appliance, a network router, switch, or bridge, or any machine capable of executing instructions (sequential or otherwise) that specify actions to be taken by that machine, such as a base station. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions, where the instructions configure the execution units to carry out a specific operation when in operation. The configuring may occur under the direction of the execution units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504, and a static memory 506, some or all of which may communicate with each other via an interlink (e.g., bus) 508. The machine 500 may further include a power management device 532, a graphics display device 510, an alphanumeric input device 512 (e.g., a keyboard), and a user interface (UI) navigation device 514 (e.g., a mouse). In an example, the graphics display device 510, alphanumeric input device 512, and UI navigation device 514 may be a touch screen display. The machine 500 may additionally include a storage device (i.e., drive unit) 516, a signal generation device 518 (e.g., a speaker), a network interface device/transceiver 520 coupled to antenna(s) 530, and one or more sensors 528, such as a global positioning system (GPS) sensor, compass, accelerometer, or other sensor. The machine 500 may include an output controller 534, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.)

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In one embodiment, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions 524. Non-limiting machine readable medium 522 examples may include solid-state memories, and optical and magnetic media. In an example, a massed machine readable medium comprises a machine readable medium 522 with a plurality of particles having resting mass. Specific examples of massed machine readable media may include non-volatile memory, such as semiconductor memory devices (e.g., Electrically Programmable Read-Only-Memory (EPROM) or Electrically Erasable Programmable Read-Only-Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

What is claimed is:

1. A User Equipment (UE) comprising:
a processor; and
a transceiver, configured to:
enable time division period uplink transmission scheduling for dual connectivity with a Master Evolved Node B (MeNB) and a Secondary Evolved Node B (SeNB);
schedule uplink transmissions to the MeNB during odd or even numbered subframe time division periods;
schedule uplink transmissions to the SeNB during the even numbered subframe time division periods when the UE schedules the uplink transmissions to the MeNB during the odd numbered subframe time division periods, or during the odd numbered subframe time division periods when the UE schedules the uplink transmissions to the MeNB during the even numbered subframe time division periods, wherein the uplink transmissions are to be toggled between the MeNB and the SeNB following each individual time division; and
in response to scheduling of the uplink transmissions transmit a Radio Resource Control (RRC) message comprising uplink transmission scheduling information based on the scheduled uplink transmissions to at least one of the MeNB and the SeNB, wherein the RRC message specifies a time-division toggling pattern and start time to begin at a future instance.

2. The UE of claim 1 further configured to receive or transmit a Media Access Control (MAC) Control Element (CE) header comprising uplink transmission scheduling information.

3. The UE of claim 1 further configured to operate according to predetermined uplink transmission scheduling parameters.

4. The UE of claim 1 further configured to have sub-frame time division period uplink scheduling operations backwardly compatible with legacy network systems having synchronized uplink Hybrid Automatic Repeat Request (HARQ) operations.

5. The UE of claim 1 further configured to have full power headroom of the MeNB or the SeNB available for the scheduled uplink transmissions during each of the time division periods.

6. The UE of claim 1 further configured to initiate the time division period uplink transmission scheduling by sending an initiating Radio Resource Control (RRC) message to the MeNB or the SeNB, or by receiving the initiating RRC message from the MeNB or SeNB.

7. The UE of claim 1 further configured to schedule MeNB and SeNB uplink transmissions according to variable alternating patterns and durations.

8. The UE of claim 1 further configured to schedule uplink transmissions between the MeNB and a plurality of SeNBs according to variable alternating patterns and durations.

9. The UE of claim 1 further configured to transmit a message to, or receive a message from, an Evolved Node B (eNB) having a unique Logical Channel Identifier (LCID) to identify a Media Access Control (MAC) control element (CE) comprising dual connectivity uplink transmission scheduling information.

* * * * *